(12) United States Patent
Masuo et al.

(10) Patent No.: US 12,553,870 B2
(45) Date of Patent: Feb. 17, 2026

(54) ANALYSIS APPARATUS, ANALYSIS METHOD, AND COMPUTER-READABLE RECORDING MEDIUM FOR DETECTING DETERIORATION IN TCD

(71) Applicant: YOKOGAWA ELECTRIC CORPORATION, Musashino (JP)

(72) Inventors: Kazuki Masuo, Tokyo (JP); Ryota Ichimura, Tokyo (JP); Hideyuki Mochizuki, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 679 days.

(21) Appl. No.: 17/688,228

(22) Filed: Mar. 7, 2022

(65) Prior Publication Data
US 2022/0308023 A1 Sep. 29, 2022

(30) Foreign Application Priority Data
Mar. 29, 2021 (JP) .................................. 2021-055020

(51) Int. Cl.
*G01N 30/86* (2006.01)
*G01N 30/02* (2006.01)
*G01N 30/62* (2006.01)
*G06N 20/00* (2019.01)

(52) U.S. Cl.
CPC .............. *G01N 30/86* (2013.01); *G01N 30/62* (2013.01); *G06N 20/00* (2019.01); *G01N 2030/025* (2013.01)

(58) Field of Classification Search
None
See application file for complete search history.

(56) References Cited

U.S. PATENT DOCUMENTS

| 4,307,453 | A | * | 12/1981 | Kleiss | .................... G06G 7/184 |
| | | | | | 73/23.23 |
| 4,674,323 | A | | 6/1987 | Rulf et al. | |
| 5,592,402 | A | | 1/1997 | Beebe et al. | |
| 6,148,266 | A | * | 11/2000 | Ito | ............................ G06F 17/10 |
| | | | | | 702/85 |
| 2002/0052701 | A1 | * | 5/2002 | Gorenstein | ............ G01N 30/82 |
| | | | | | 702/74 |
| 2010/0064770 | A1 | * | 3/2010 | Kawana | ............. G01N 30/8668 |
| | | | | | 73/23.35 |

(Continued)

FOREIGN PATENT DOCUMENTS

| JP | 6-341994 A | 12/1994 |
| JP | H06341994 A | * 12/1994 |

(Continued)

OTHER PUBLICATIONS

JPH06341994A translation (Year: 1994).*

(Continued)

*Primary Examiner* — Lina Cordero
(74) *Attorney, Agent, or Firm* — WHDA, LLP (57) ABSTRACT

An analysis apparatus includes an extraction unit that extracts a baseline portion from chromatographic data that is acquired from an apparatus, and a determination unit that determines a normality in the apparatus based on normal chromatographic data and a feature of the baseline portion of the chromatographic data extracted by the extraction unit.

8 Claims, 6 Drawing Sheets

(56) References Cited

U.S. PATENT DOCUMENTS

2010/0280811 A1 11/2010 Gorenstein et al.
2016/0282272 A1* 9/2016 Lin .................... G01N 21/6489

FOREIGN PATENT DOCUMENTS

| JP | 8-500898 A | 1/1996 |
| JP | 2004-61199 A | 2/2004 |
| JP | 2007-139623 A | 6/2004 |
| JP | 2018-152000 A | 9/2018 |
| JP | 2020-064058 A | 4/2020 |
| WO | 93/21592 A1 | 10/1993 |
| WO | 2019/203972 A1 | 10/2019 |

OTHER PUBLICATIONS

Extended European Search Report dated Aug. 5, 2022, issued in counterpart EP application No. 22161035.5. (7 pages).
"Gas chromatography lessons for beginner, fourth lesson, what is TCD detector?", [online], Jan. 6, 2021, J-Science Lab Co., Ltd., [searched on Jan. 26, 2021], Internet <URL:https://http://j-sl.com/feature/gas/study04>. w/English Translation. (5 pages).
Office Action dated Feb. 14, 2023, issued in counterpart JP Application No. 2021-055020 with English machine translation. (5 pages).

* cited by examiner

ANALYSIS APPARATUS, ANALYSIS METHOD, AND COMPUTER-READABLE RECORDING MEDIUM FOR DETECTING DETERIORATION IN TCD

CROSS-REFERENCE TO RELATED APPLICATION

The present application claims priority to and incorporates by reference the entire contents of Japanese Patent Application No. 2021-055020 filed in Japan on Mar. 29, 2021.

FIELD

Exemplary embodiment disclosed herein relates to an analysis apparatus, an analysis method, and an analysis program.

BACKGROUND

There has been known a gas chromatograph that is referred to as a Thermal Conductivity Detector (TCD). The gas chromatograph is a gas analyzer that divides multicomponent mixed gas and/or volatile liquid into single components so as to detect each of the divided components. Multi-components are able to be simultaneously measured without interference due to another component. A predetermined amount of a measurement sample is taken in a constant-temperature bath in which the temperature is controlled to be constant, and further is led into a column by a carrier gas. The multicomponent measurement sample is divided into single components in the column, and the divided components are eluted from the column one-by-one. The single component eluted from the column is converted into an electric signal by a detector so as to obtain a chromatogram. From peak areas of the obtained chromatogram (chromatographic data), concentrations of the components are individually calculated.

TCD is a detector that uses difference between a thermal conductivity of a measurement component and a thermal conductivity of a carrier gas so as to extract an unbalanced voltage generated in a bridge circuit as a concentration signal. As a gas chromatograph, various detectors are employed depending on a measurement component, a concentration thereof, and a measurement condition. Among them, TCD is able to be inexpensively manufactured, and further is able to measure all components other than a carrier gas in principle.

Non Patent Literature 1: "Gas chromatography lessons for beginner, fourth lesson, what is TCD detector?" [online], Jan. 6, 2021, J-Science Lab Co., Ltd., [searched on Jan. 26, 2021], Internet <URL:https://http://j-sl.com/feature/gas/study04>

However, in a TCD, it is difficult to keep its sensitivity. For example, the sensitivity of a TCD is comparatively low, and thus is not appropriate for measurement of a component having a low concentration. Therefore, it is necessary to detect deterioration in a TCD itself so as to prevent drop in the sensitivity of component measurement.

One aspect of the embodiment is made in view of the aforementioned, and an object of the present disclosure is to detect deterioration in a TCD so as to prevent drop in the sensitivity.

SUMMARY

According to an aspect of an embodiment, an analysis apparatus includes an extraction unit that extracts a baseline portion from chromatographic data that is acquired from an apparatus, and a determination unit that determines a normality in the apparatus based on normal chromatographic data and a feature of the baseline portion of the chromatographic data extracted by the extraction unit.

According to an aspect of an embodiment, an analysis method includes extracting a baseline portion from chromatographic data acquired from an apparatus, and determining a normality in the apparatus based on normal chromatographic data and a feature of the baseline portion of the extracted chromatographic data.

According to an aspect of an embodiment, a computer-readable recording medium stores therein a control program configured to cause a computer to execute extracting a baseline portion from chromatographic data acquired from an apparatus, and determining a normality in the apparatus based on normal chromatographic data and a feature of the baseline portion of the extracted chromatographic data.

According to one aspect of embodiments, it is possible to detect deterioration in a TCD so as to prevent drop in the sensitivity.

DETAILED DESCRIPTION OF THE PREFERRED EMBODIMENTS

Hereinafter, embodiments of an analysis method, an analysis program, and an information processing device according to the present application will be described in detail with reference to the accompanying drawings. The present disclosure is not limited to the embodiments described in the following. The same elements are provided with the respective same reference symbols, duplicated explanation is appropriately omitted, and the embodiments may be appropriately combined within a consistent range.

Analysis Apparatus

Figure 1:
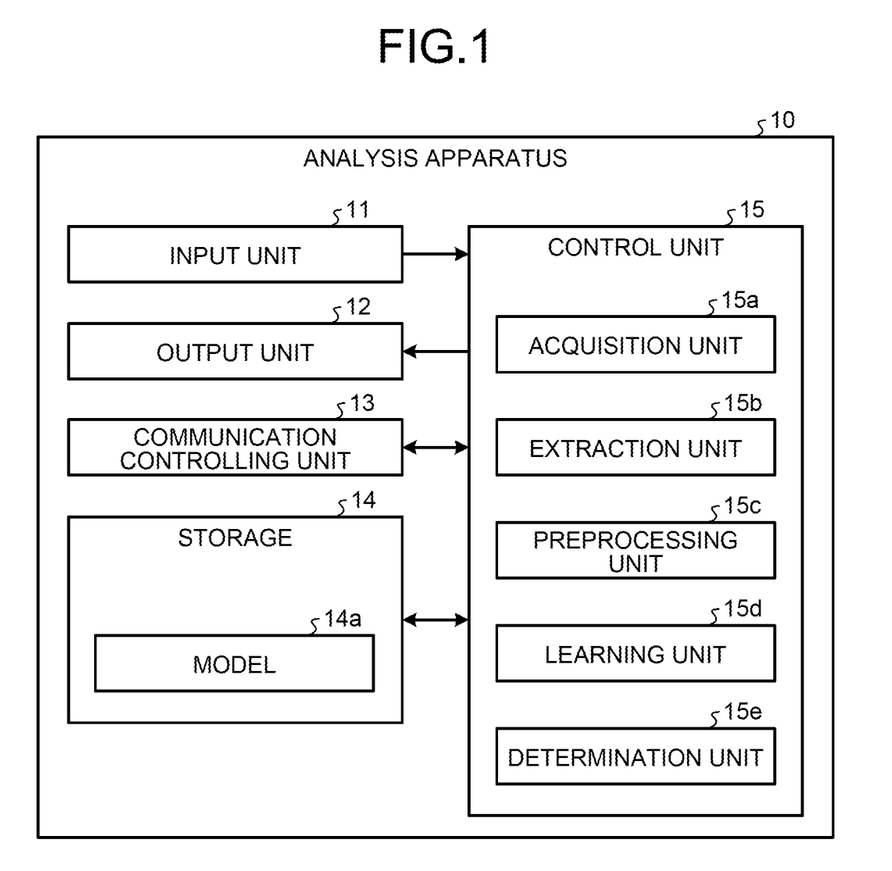
FIG. 1 is a functional block diagram illustrating a functional configuration of an analysis apparatus according to an embodiment.

FIG. 1 is a functional block diagram illustrating a functional configuration of an analysis apparatus according to an embodiment. As illustrated in FIG. 1, an analysis apparatus 10 is realized by a general-purpose computer such as a personal computer and a workstation so as to include an input unit 11, an output unit 12, a communication controlling unit 13, a storage 14, and a control unit 15. The analysis apparatus 10 may include another function unit not limited to the illustrated function units.

The input unit 11 is realized by using an input device such as a keyboard and a mouse so as to input various kinds of instruction information, such as start of processing, to the control unit 15 in response to an input operation of an operator. The output unit 12 is realized by a display such as a liquid crystal display, a printing device such as a printer, etc. For example, result of analysis processes to be mentioned later is displayed on the output unit 12.

The communication controlling unit 13 is realized by a Network Interface Card (NIC) and the like so as to control communication between an external device and the control unit 15 via an electric communication network such as a Local Area Network (LAN) and the Internet. For example, the communication controlling unit 13 controls communication between the control unit 15 and a management device that manages chromatographic data output from a target device of an analysis process and the like.

The storage 14 is realized by a semiconductor memory element such as a Random Access Memory (RAM) and a flash memory, or a storage such as a hard disk and an optical disk. Processing programs for operating the analysis apparatus 10 and data to be used in execution in the processing programs are preliminarily stored, or are temporarily stored for each of the processes in the storage 14. The storage 14 stores therein a model 14a to be used in analysis processes to be mentioned later and result of the analysis processes. The storage 14 may be configured to communicate with the control unit 15 via the communication controlling unit 13.

The control unit 15 is realized by using a Central Processing Unit (CPU) and the like so as to execute processing programs stored in the memory. Thus, as illustrated in FIG. 1, the control unit 15 functions as an acquisition unit 15a, an extraction unit 15b, a preprocessing unit 15c, a learning unit 15d, and a determination unit 15e. Note that all or a part of the above-mentioned function units may be implemented on different hardware devices. For example, the learning unit 15d may be implemented on a learning device that is different from the determination unit 15e. Note that the control unit 15 may include another function unit.

The acquisition unit 15a acquires chromatographic data from an apparatus. For example, the acquisition unit 15a acquires chromatographic data output from a target device of an analysis process via the input unit 11, or via the communication controlling unit 13 from the target device of the analysis process, a management device that manages chromatographic data output from the apparatus, or the like.

Specifically, the acquisition unit 15a acquires target normal chromatographic data of a TCD of an analysis process via the extraction unit 15b and the preprocessing unit 15c, which are to be mentioned later, and supplies the acquired data to processing of the learning unit 15d. For example, the acquisition unit 15a supplies, to the learning unit 15d, 100 or more pieces from the beginning of chromatographic data after replacement with a normal TCD.

The acquisition unit 15a acquires chromatographic data of a TCD in operation of an analysis target, and supplies, to processing of the determination unit 15e, the acquired data via the extraction unit 15b and the preprocessing unit 15c that are to be mentioned later. In this case, the acquisition unit 15a acquires pieces of chromatographic data having the number equal to that of the chromatographic data supplied to the learning unit 15d, and supplies the acquired data to the determination unit 15e.

The acquisition unit 15a may store the acquired chromatographic data in the storage 14. Or the acquisition unit 15a may directly transmit the acquired chromatographic data to the extraction unit 15b in the latter part without storing the acquired data in the storage 14.

Figure 2:
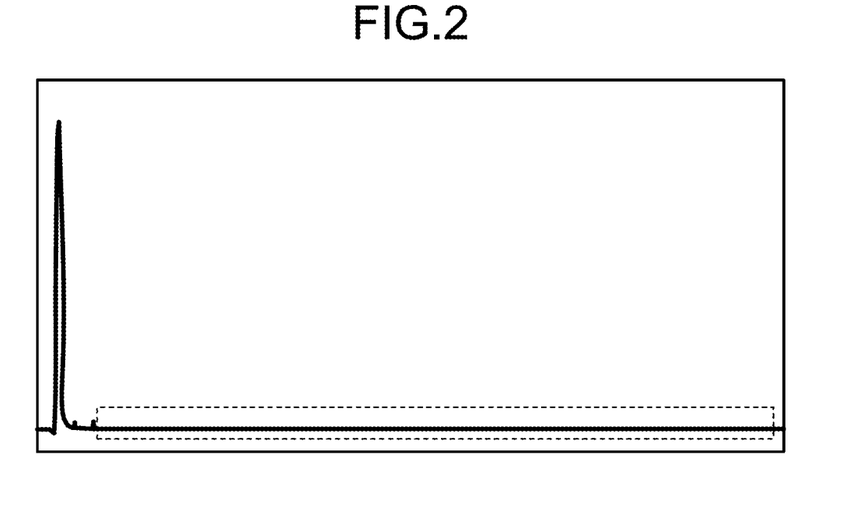
FIG. 2 is a diagram illustrating a process to be executed by the analysis apparatus.
Figure 3A:
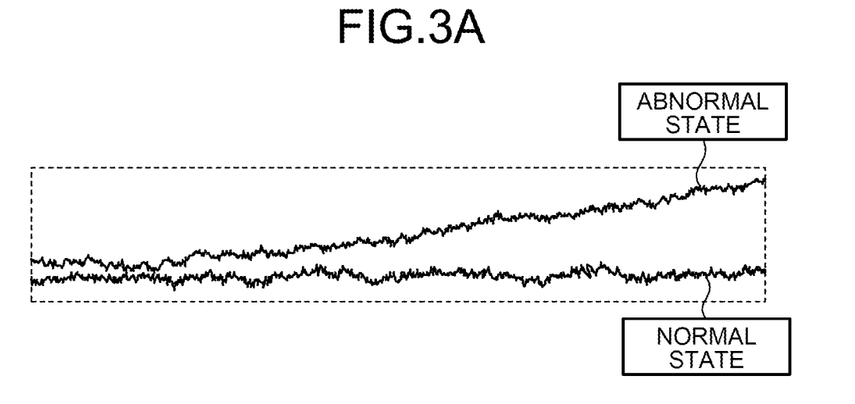
FIG. 3A is a diagram illustrating a process to be executed by the analysis apparatus.
Figure 3B:
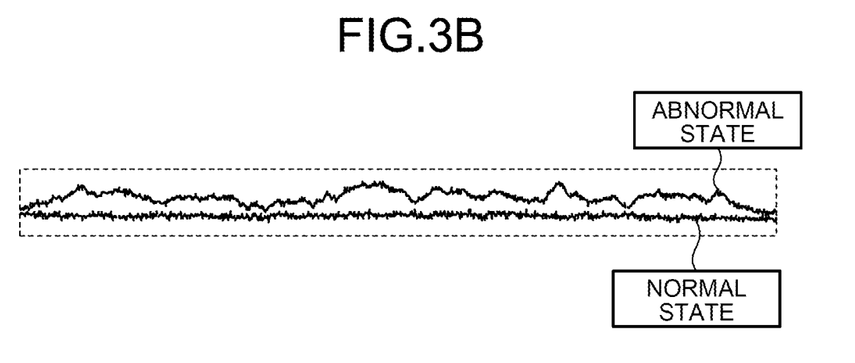
FIG. 3B is a diagram illustrating a process to be executed by the analysis apparatus.

The extraction unit 15b extracts a baseline portion (in other words, baseline portion of corresponding chromatographic data) from chromatographic data acquired from an apparatus. Herein, FIGS. 2, 3A, and 3B are diagrams illustrating processes to be executed by the analysis apparatus. In FIG. 2, chromatographic data of an apparatus are illustrated. As indicated by a dashed-line frame illustrated in FIG. 2, chromatographic data of an apparatus include, in addition to a peak portion that is corresponding to detected components, a baseline portion whose change is much smaller than that in the peak portion.

In a case where an apparatus is normal, change in noise is minute and is not able to be visually recognized, and thus a baseline portion is a substantially-linear line. On the other hand, in a case where some kind of abnormality has occurred in an apparatus, inclination occurs in the baseline as illustrated in FIG. 3A, or noise becomes large as illustrated in FIG. 3B. Thus, in an analysis process to be mentioned later of the analysis apparatus according to the present embodiment, a baseline portion is measured so as to detect abnormality due to deterioration in an apparatus and the like.

Returning to explanation of FIG. 1. The preprocessing unit 15c extracts features of a baseline portion as preprocessing of the analysis process to be mentioned later. For example, the preprocessing unit 15c calculates, as features of the baseline portion, an average value, a maximum value, a minimum value, a difference between the maximum value and the minimum value, a variance value, and the like of the baseline portion.

The learning unit 15d learns the model 14a that outputs an evaluation value reflecting a normality in an apparatus, while using chromatographic data acquired from the apparatus as input data. Specifically, the learning unit 15d generates, by learning, the model 14a that outputs an evaluation value reflecting a normality in the apparatus, while using features of a baseline portion of normal chromatographic data as teacher data.

For example, the learning unit 15d generates, by learning, the model 14a that outputs an evaluation value of the apparatus, while using features of a baseline portion which are extracted by the preprocessing unit 15c from normal chromatographic data as teacher data. The learning unit 15d stores the generated model 14a in the storage 14.

Note that the learning unit 15d may execute learning of the model 14a that outputs an evaluation value reflecting a normality in an apparatus, while using abnormal chromatographic data as teacher data in addition to normal chromatographic data or instead of normal chromatographic data. Thus, the model 14a is generated which outputs an evaluation value reflecting a normality in an apparatus with high accuracy.

Returning to explanation of FIG. 1. The determination unit 15e determines a normality in an apparatus on the basis of normal chromatographic data and features of a baseline portion in chromatographic data which are extracted from the preprocessing unit 15c. Specifically, the determination unit 15e determines a normality in an apparatus while using chromatographic data (in other words, chromatographic data of TCD in operation of analysis target) acquired from the apparatus as input data, further using normal chromatographic data as teacher data, and further using the model 14a learned by the learning unit 15d. For example, in a case where an evaluation value output from the model 14a is within a predetermined range of a threshold value, the determination unit 15e determines that an apparatus is normal.

The determination unit 15e may determine a normality in an apparatus, while using chromatographic data acquired from the apparatus as input data, and further using the model 14a that is learned with the use of abnormal chromatographic data, in addition to normal chromatographic data or instead of normal chromatographic data, as teacher data. In other words, the determination unit 15e may use the model 14a that is learned by the above-mentioned learning unit 15d by using abnormal chromatographic data, in addition to normal chromatographic data or instead of normal chromatographic data, as teacher data. Thus, it is possible to determine a normality in the apparatus with higher accuracy.

Herein, as described above, in a case where some kind of abnormality has occurred in an apparatus, inclination occurs in the baseline as illustrated in FIG. 3A, or noise becomes large as illustrated in FIG. 3B. The determination unit 15e determines a normality in the apparatus on the basis of an inclination of a baseline portion and normal chromatographic data as features of the baseline portion. Or the determination unit 15e determines a normality in an apparatus on the basis of normal chromatographic data and intensity of noise in a baseline portion as features of the baseline portion.

Figure 4:
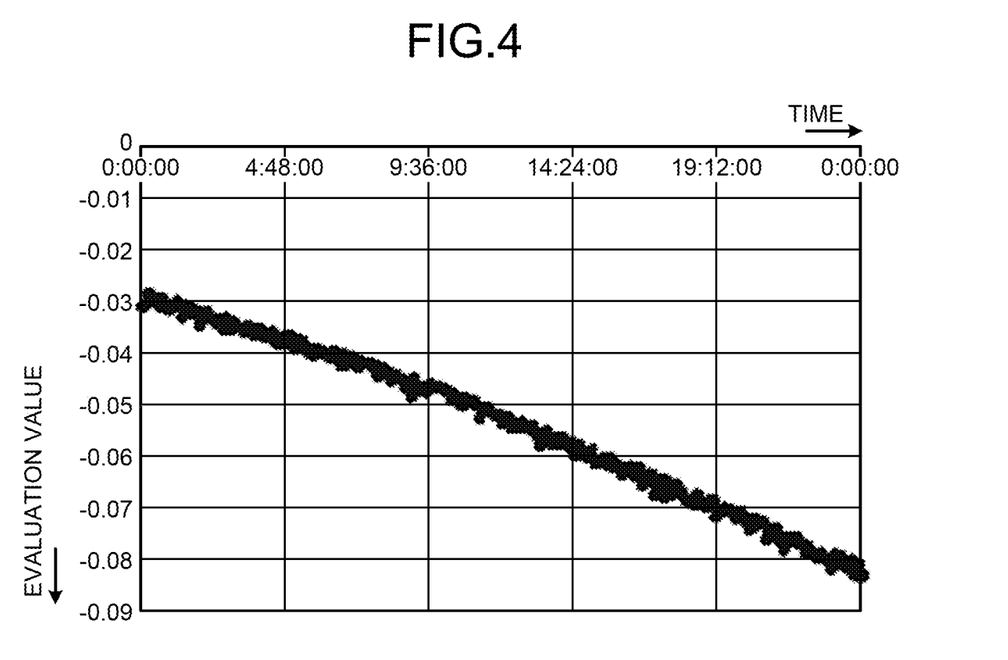
FIG. 4 is a diagram illustrating a process to be executed by the analysis apparatus.

FIG. 4 is a diagram illustrating a process to be executed by the analysis apparatus. In FIG. 4, there is exemplified a case where the model 14a is employed in which the determination unit 15e outputs, as features of a baseline portion, an evaluation value of a normality by using an average value and a difference between a maximum value and a minimum value, in other words, by using intensity of noise in the baseline portion. Herein, in FIG. 4, a lateral axis indicates time, and a vertical axis indicates an evaluation value (dimensionless) in analysis using artificial intelligence (AI).

In this case, the learning unit 15d generates, by learning, the model 14a that outputs an evaluation value of a normality by using an average value and a difference between a maximum value and a minimum value in a baseline portion of normal chromatographic data of an apparatus. Next, the determination unit 15e inputs data on a baseline portion of chromatographic data of an apparatus in operation to the already-learned model 14a so as to obtain an evaluation value of an apparatus.

In the example illustrated in FIG. 4, an evaluation value indicating a normality is reduced over time. In a case where an output evaluation value deviates from a preliminarily set range of threshold value, the determination unit 15e determines that an apparatus is abnormal. As described above, the analysis apparatus 10 is capable of detecting an abnormality due to time deterioration of an apparatus and the like, for example.

In a case where determining that an apparatus is abnormal, the determination unit 15e may transmits alarm and the like to a manager of the apparatus. For example, in a case where the number of times and/or a frequency of determination of abnormality in the apparatus exceeds a predetermined threshold value, the determination unit 15e outputs alarm and/or an error display to a management device used by a manager.

Analysis Method

Figure 5:
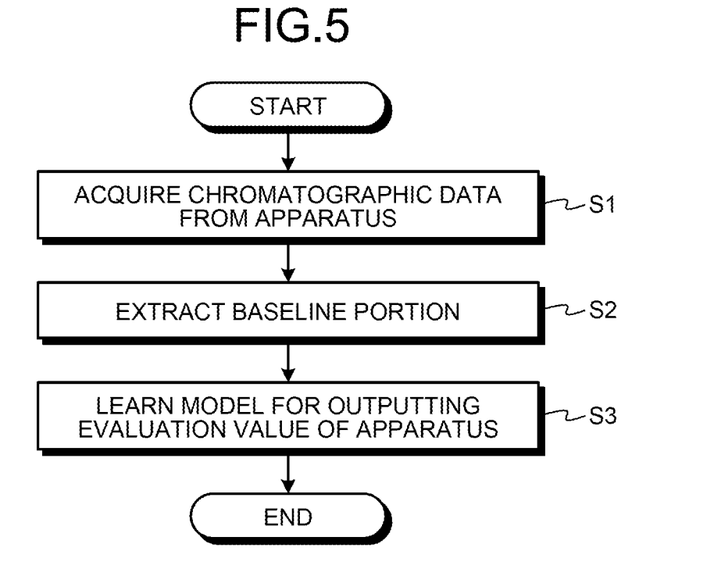
FIG. 5 is a flowchart illustrating flow of a process according to the embodiment.
Figure 6:
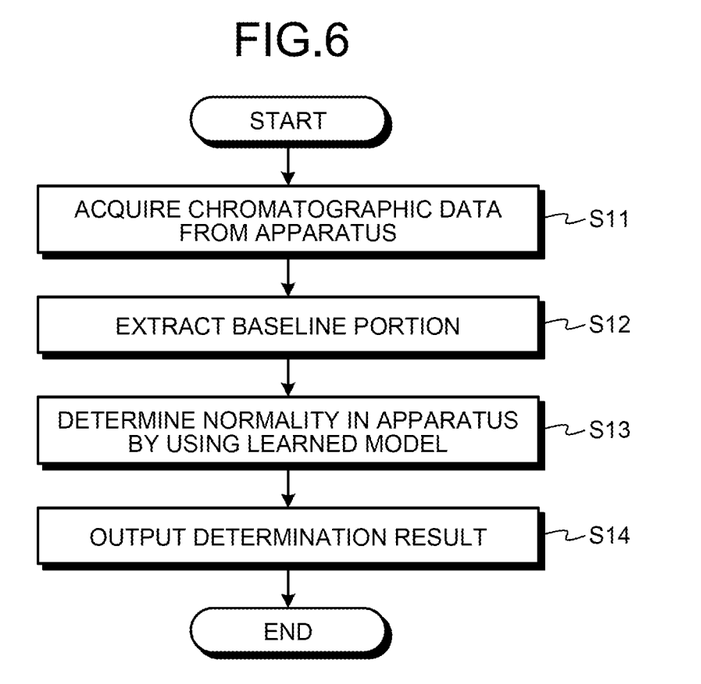
FIG. 6 is a flowchart illustrating flow of a process according to the embodiment.

FIGS. 5 and 6 are flowcharts illustrating flows of processes according to the embodiment. An analysis process (analysis method) according to the present embodiment includes a learning process and a determination process. The learning process illustrated in FIG. 5 is started at a timing when a user including a manager and/or an operator orders a start of the learning process, for example. Note that a start of the learning process is not limited to an order from a user, and may be automatically started by a program, for example.

First, the acquisition unit 15a acquires normal chromatographic data of a target TCD of the analysis process (Step S1). The extraction unit 15b extracts a baseline portion from the acquired chromatographic data (Step S2). The preprocessing unit 15c extracts features of the baseline portion.

The learning unit 15d uses, as teacher data, the features of the baseline portion which are extracted by the preprocessing unit 15c from the normal chromatographic data, and further generates, by learning, the model 14a for outputting an evaluation value of the apparatus (Step S3). The learning unit 15d stores the generated model 14a in the storage 14. Thus, a series of learning processes ends.

Next, the determination process illustrated in FIG. 6 is started at a timing when a user including a manager and/or an operator orders a start of the determination process, for example. Note that a start of the determination process is not limited to an order from a user, and may be automatically started by a program, for example.

First, the acquisition unit 15a acquires chromatographic data of a target TCD in operation of the analysis process (Step S11). The extraction unit 15b extracts a baseline portion from the acquired chromatographic data (Step S12). The preprocessing unit 15c extracts features of the baseline portion.

The determination unit 15e determines, by using the already-learned model 14a, a normality in the apparatus while using, as input data, the features of the baseline portion extracted by the preprocessing unit 15c from the acquired chromatographic data (Step S13).

The determination unit 15e outputs determination result to the output unit 12 (Step S14). For example, in a case where determining that a target device of the analysis process is abnormal, the determination unit 15e outputs alarm and/or an error message to a management device of the apparatus. Thus, a series of determination processes ends.

Effects

As described above, the analysis apparatus 10 according to the present embodiment includes the extraction unit 15b and the determination unit 15e. The extraction unit 15b extracts a baseline portion from chromatographic data that is acquired from an apparatus. The determination unit 15e determines a normality in the apparatus based on normal chromatographic data and a feature of the baseline portion of the chromatographic data extracted by the extraction unit 15b. Thus, the analysis apparatus 10 is capable of detecting deterioration in the apparatus in operation in real time so as to deal with it. Therefore, it is possible to prevent a case where a TCD is periodically replaced with unnecessarily high frequency before occurrence of a failure or a case where a failure has occurred and a negative effect, such as stopping a part of function of a plant, is wielded, so as to restore the function therefrom. As described above, in accordance with the analysis apparatus 10 according to the present embodiment, it is possible to easily prevent a case where the sensitivity of a TCD in operation is reduced without additionally adding thereto a sensor, so that it is further possible to keep the sensitivity.

The determination unit 15e determines a normality in the apparatus based on the normal chromatographic data and an inclination of the baseline portion as a feature of the baseline portion. Or the determination unit 15e determines a normality in the apparatus based on the normal chromatographic data and an intensity of noise in the baseline portion as a feature of the baseline portion. Thus, the analysis apparatus 10 is capable of determining a normality in an apparatus with high accuracy.

The determination unit 15e uses, as input data, the chromatographic data acquired from the apparatus to determine a normality in the apparatus by using a model on which learning is executed by using the normal chromatographic data as teacher data. Thus, the analysis apparatus 10 is capable of determining a normality in an apparatus with high accuracy.

The determination unit 15e uses, as input data, the chromatographic data acquired from the apparatus to determine a normality in the apparatus by using the model 14a on which learning is executed by using, as teacher data, abnormal chromatographic data in addition to the normal chromatographic data or instead of the normal chromatographic data. Thus, the analysis apparatus 10 is capable of determining a normality in an apparatus with higher accuracy.

The learning unit 15d uses, as input data, the chromatographic data acquired from the apparatus to learn the model 14a that outputs an evaluation value reflecting the normality in the apparatus. Thus, the analysis apparatus 10 is capable of generating the model 14a that outputs an evaluation value reflecting a normality in an apparatus with high accuracy, and further capable of determining a normality in the apparatus with high accuracy.

Practical Embodiment

Figure 7A:
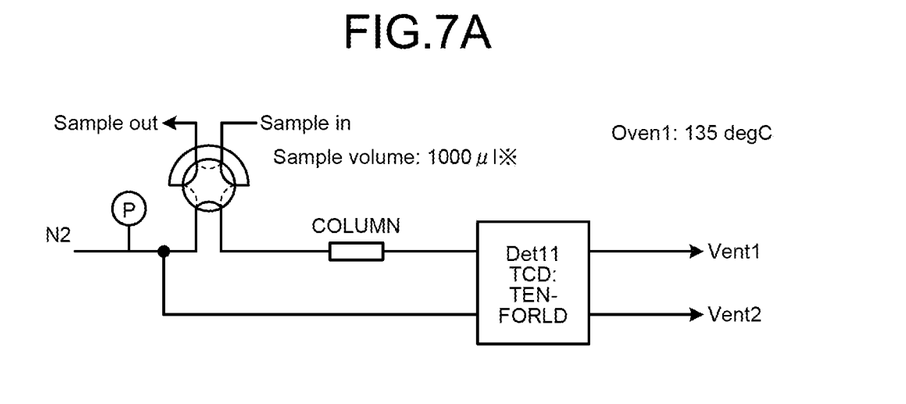
FIG. 7A is a diagram illustrating a practical embodiment.
Figure 7B:
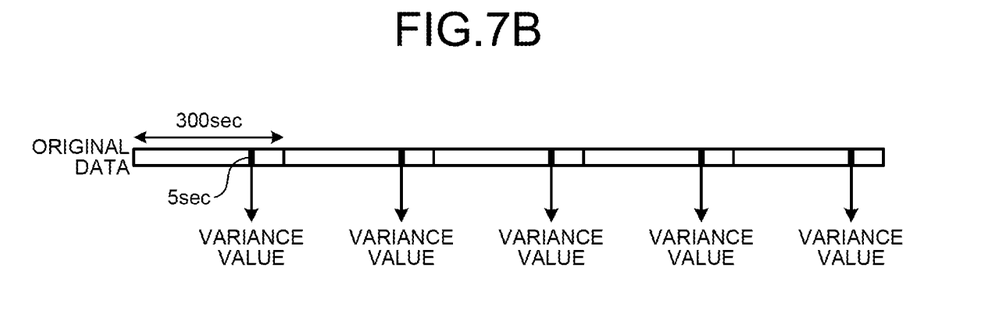
FIG. 7B is a diagram illustrating the practical embodiment.
Figure 7C:
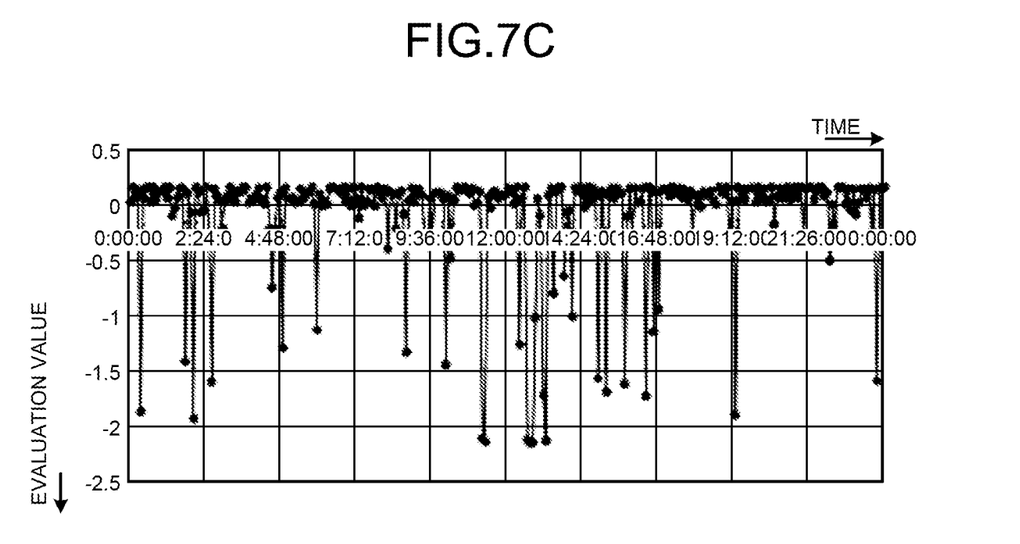
FIG. 7C is a diagram illustrating the practical embodiment.

FIGS. 7A to 7C are diagrams illustrating a practical embodiment. In the present practical embodiment, dust was intendedly intruded into a TCD so as to generate abnormality in a baseline portion. Specifically, with the use of an apparatus indicated by a piping diagram illustrated in FIG. 7A, air was sampled so as to oxidize a filament of the TCD by using oxygen included in the air, and thus abnormality in a baseline portion was generated. Specifically, air was sampled at intervals of 300 seconds to generate peaks, and data were collected for 24 hours. In this case, chromatographic data in an abnormal state was obtained, which was illustrated in FIG. 3A.

In the example illustrated in FIG. 7A, a column that was attached to the front of the TCD was processed such that filler of fine particles that were packed into the column leaked therefrom. In this case, chromatographic data in an abnormal state illustrated in FIG. 3B was obtained.

Preprocessing was executed on each of the chromatographic data in a normal state and the chromatographic data in an abnormal state. Specifically, 288 pieces of data were acquired during 24 hours while using chromatographic data at intervals of 300 seconds as one piece of data. As illustrated in FIG. 7B, a baseline portion having a predetermined range of approximately 1 to 10 seconds (5 seconds in present practical embodiment) was extracted from each piece of the data, and a corresponding variance value was calculated. Note that the predetermined range was set to approximately 1 to 10 seconds because noise in a baseline portion was minute so as to prevent a case where an element other than noise was included therein when a time interval of data was longer than the above-mentioned time interval.

As a result, as illustrated in FIG. 7C, an evaluation value of chromatographic data in an abnormal state largely deviated from that in a normal state many times. For example, points illustrated in FIG. 7C whose evaluation values were lower than −0.5 were obtained by plotting the abnormal state illustrated in FIG. 3B, and many points illustrated in FIG. 7C whose evaluation values were approximately zero were obtained by plotting the normal state illustrated in FIG. 3B. As described above, when noise in a baseline portion was unstable, the analysis apparatus 10 was capable of detecting abnormality in an apparatus.

Other Embodiments

As described above, the embodiment according to the present disclosure has been explained, the present disclosure may be implemented in various different modes in addition to the above-mentioned embodiment.

For example, the features of the baseline portion exemplified in the above-mentioned embodiment are merely examples, and further may be arbitrarily changed. Moreover, various algorithms such as a neural network, deep learning, and a support vector machine may be employed for the model 14a generated by the learning unit 15d.

Analysis Program

Any of the processing procedures, the specific appellations, and the information including various data and parameters, which are described in the specification and the accompanying drawings, may be arbitrarily changed if not otherwise specified.

The illustrated components of the apparatuses are functionally conceptual, and thus they are not to be physically configured as illustrated in the drawings. Specific forms of distribution and integration of the configuration elements of the illustrated devices are not limited to those illustrated in the drawings. All or some of the apparatuses can be configured by separating or integrating the apparatus functionally or physically in any unit, according to various types of loads, the status of use, etc.

Moreover, whole or an arbitrary part of processing function executed by each of the apparatuses is realized by a CPU and a program executed by the CPU, or is realized as hardware by wired logic. For example, an analysis program may be executed in the cloud. The above-mentioned analysis program may execute a process for causing a computer to extract a baseline portion from chromatographic data acquired from an apparatus so as to determine a normality in the apparatus on the basis of normal chromatographic data and features of the extracted baseline portion of the chromatographic data.

Hardware

Figure 8:
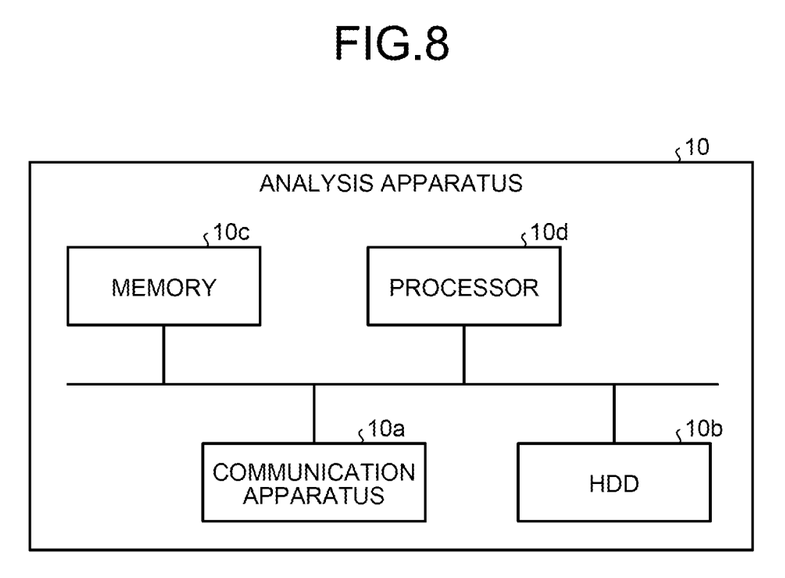
FIG. 8 is a diagram illustrating a hardware configuration example.

Next, a hardware configuration example of the analysis apparatus 10 will be explained. FIG. 8 is a diagram illustrating the hardware configuration example. As illustrated in FIG. 8, the analysis apparatus 10 includes a communication apparatus 10a, a Hard Disk Drive (HDD) 10b, a memory 10c, and a processor 10d. The units illustrated in FIG. 8 are connected to each other by bus.

The communication apparatus 10a is a network interface card and the like so as to communicate with another server. The HDD 10b stores therein programs and a database (DB) for causing the function illustrated in FIG. 1 to operate.

The processor 10d reads, from the HDD 10b and the like, a program for executing a process similar to the processing units illustrated in FIG. 1, and expands the read program in the memory 10c so as to cause processes for executing functions having been explained with reference to FIG. 1 and the like to operate. For example, the process executes function similar to the processing units included in the analysis apparatus 10. Specifically, the processor 10d reads, from the HDD 10b and the like, a program having function similar to the acquisition unit 15a, the extraction unit 15b, the preprocessing unit 15c, the learning unit 15d, the determination unit 15e, and the like. Next, the processor 10d executes the process for executing processes similar to the acquisition unit 15a, the extraction unit 15b, the preprocessing unit 15c, the learning unit 15d, the determination unit 15e, and the like.

As described above, the analysis apparatus 10 reads and executes an analysis program so as to operate as the information processing device that executes the analysis method. In other words, the analysis apparatus 10 may be an information processing device such as a PC in which the analysis program is installed. The analysis apparatus 10 may read the above-mentioned program from a recording medium by using a medium reading device, and further may execute the read program so as to realize function similar to the above-mentioned embodiment. Note that the program according to the other embodiment is not limitedly executed by the analysis apparatus 10. For example, in a case where another computer or another server executes a program, and further in a case where these execute a program in cooperation with each other, the present disclosure may be similarly applied.

The program is able to be delivered via a network such as the Internet. The program is recorded in a computer readable recording medium such as a hard disk, a flexible disk (FD), a CD-ROM, a Magneto-Optical disk (MO), and a Digital Versatile Disc (DVD), and is read out from the recording medium by a computer so as to be executed.

What is claimed is:

1. An analysis apparatus comprising:
    an extraction unit that extracts a baseline portion whose change is much smaller than that in a peak portion from chromatographic data that is output from a target apparatus of an analysis process; and
    a determination unit that determines a normality in the target apparatus of the analysis process based on normal chromatographic data of the target apparatus of the analysis process and a feature of the baseline portion of the chromatographic data extracted by the extraction unit, wherein
    the target apparatus is a Thermal Conductivity Detector,
    the determination unit determines the target apparatus is abnormal when a difference of an inclination of the baseline portion between the normal chromatographic data and the chromatographic data acquired from the target apparatus exceeds a predetermined threshold value, and
    when the determination unit determines the target apparatus is abnormal, the determination unit outputs an alarm or an error message.

2. The analysis apparatus according to claim 1, wherein the determination unit determines the normality in the target apparatus based on the normal chromatographic data and an intensity of noise in the baseline portion as the feature of the baseline portion.

3. The analysis apparatus according to claim 1, wherein the determination unit uses, as input data, the chromatographic data acquired from the target apparatus to determine the normality in the target apparatus by using a model on which learning is executed by using the normal chromatographic data as teacher data.

4. The analysis apparatus according to claim 3, wherein the determination unit uses, as the input data, the chromatographic data acquired from the target apparatus to determine the normality in the target apparatus by using the model on which the learning is executed by using, as the teacher data, abnormal chromatographic data in addition to the normal chromatographic data or instead of the normal chromatographic data.

5. The analysis apparatus according to claim 3 further comprising:
    a learning unit that uses, as the input data, the chromatographic data acquired from the target apparatus to learn the model that outputs an evaluation value reflecting the normality in the target apparatus.

6. The analysis apparatus according to claim 1, wherein the extraction unit extracts the baseline portion from the chromatographic data that is acquired from the target apparatus in operation by dividing a measurement sample of a multicomponent mixed gas into single components, and
    the determination unit determines the normality in the target apparatus in operation based on the normal chromatographic data.

7. An analysis method comprising:
    extracting a baseline portion whose change is much smaller than that in a peak portion from chromatographic data output from a target apparatus of an analysis process; and
    determining a normality in the target apparatus of the analysis process based on normal chromatographic data of the target apparatus of the analysis process and a feature of the baseline portion of the chromatographic data, wherein
    the target apparatus is a Thermal Conductivity Detector,
    the determining determines the target apparatus is abnormal when a difference of an inclination of the baseline portion between the normal chromatographic data and the chromatographic data acquired from the target apparatus exceeds a predetermined threshold value, and
    when the determining determines the target apparatus is abnormal, the determining outputs an alarm or an error message.

8. A non-transitory computer-readable recording medium having stored therein a control program configured to cause a computer to execute:
    extracting a baseline portion whose change is much smaller than that in a peak portion from chromatographic data output from a target apparatus of an analysis process; and
    determining a normality in the target apparatus of the analysis process based on normal chromatographic data of the target apparatus of the analysis process and a feature of the baseline portion of the chromatographic data, wherein
    the target apparatus is a Thermal Conductivity Detector,
    the determining determines the target apparatus is abnormal when a difference of an inclination of the baseline portion between the normal chromatographic data and the chromatographic data acquired from the target apparatus exceeds a predetermined threshold value, and
    when the determining determines the target apparatus is abnormal, the determining outputs an alarm or an error message.

* * * * *